No. 819,266. PATENTED MAY 1, 1906.
J. R. CARDWELL.
DRAFT GEAR.
APPLICATION FILED JUNE 1, 1905.
2 SHEETS—SHEET 1.
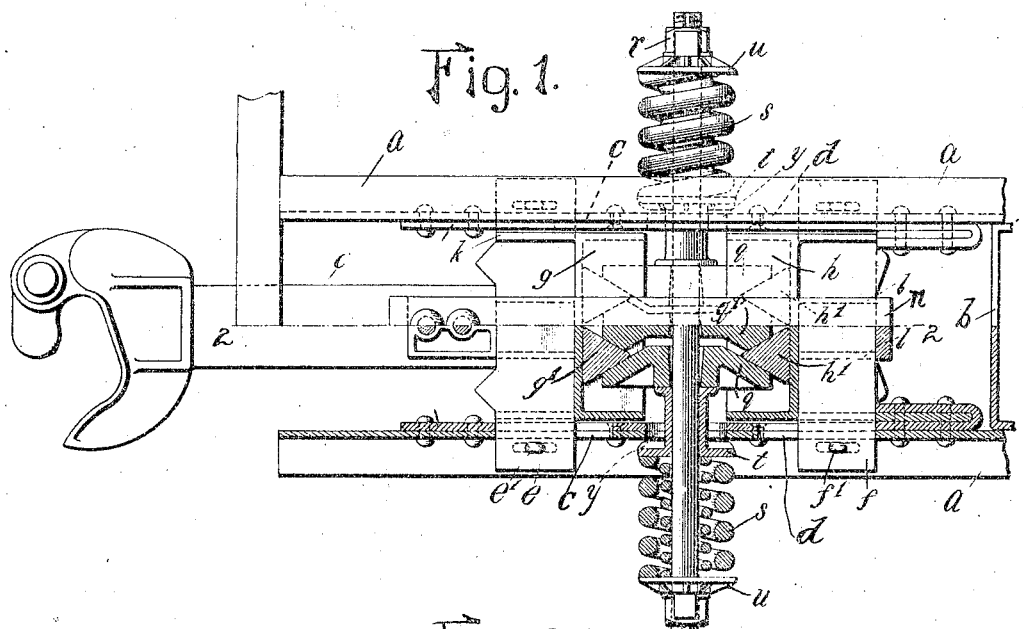
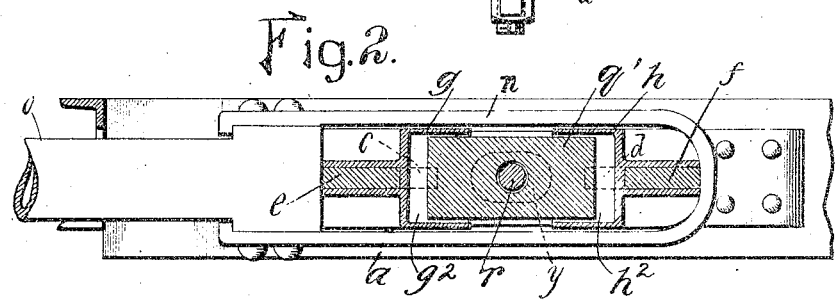
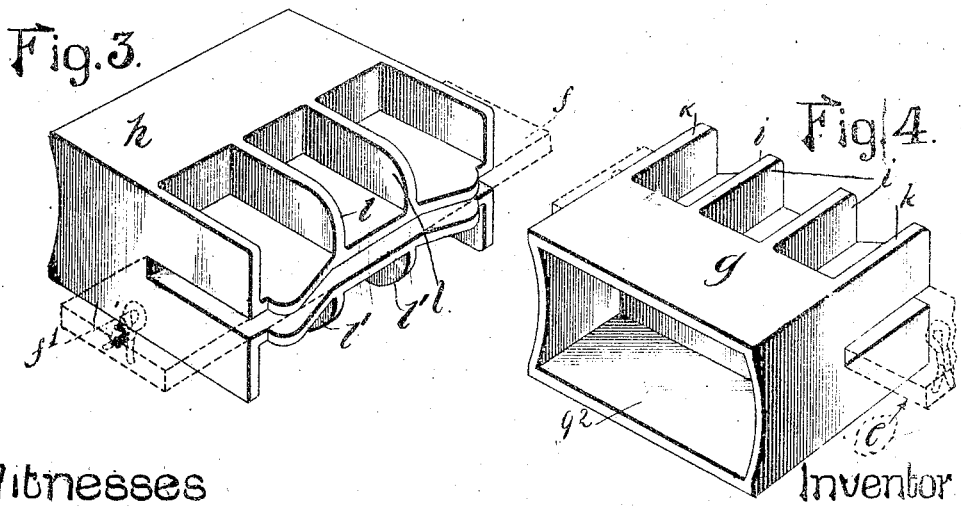
Witnesses
Chas. F. Barrett
Charles R. Macaulay
Inventor
James R. Cardwell
BY G. L. Cragg ATT'Y

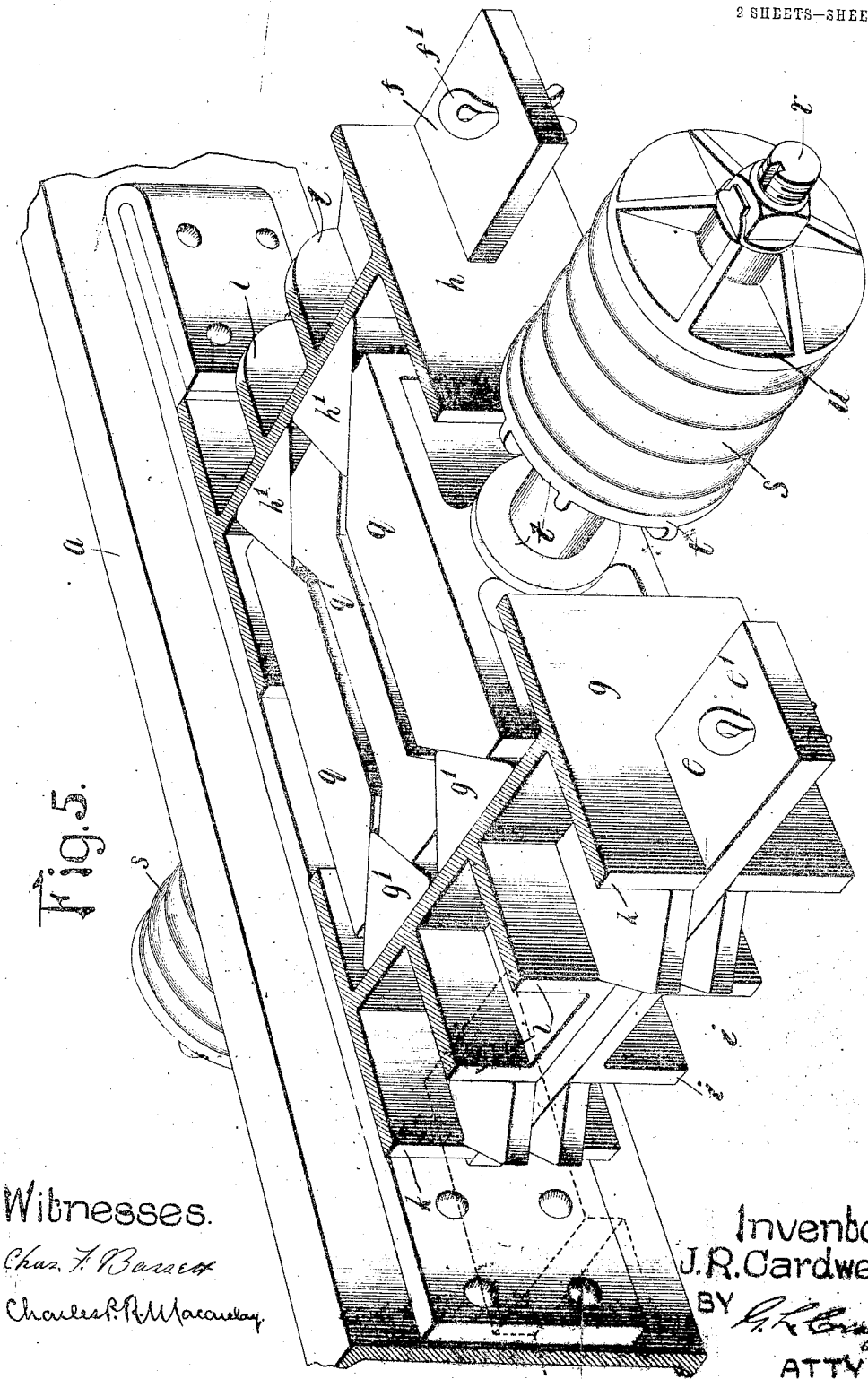

UNITED STATES PATENT OFFICE.

JAMES R. CARDWELL, OF CHICAGO, ILLINOIS.

DRAFT-GEAR.

No. 819,266.　　　Specification of Letters Patent.　　　Patented May 1, 1906.

Application filed June 1, 1905. Serial No. 263,329.

*To all whom it may concern:*

Be it known that I, JAMES R. CARDWELL, a citizen of the United States, residing at Chicago, in the county of Cook and State of Illinois, have invented a certain new and useful Improvement in Draft-Gear, of which the following is a full, clear, concise, and exact description, reference being had to the accompanying drawings, forming a part of this specification.

My invention relates to friction draft-gear employed in railway service, and has for its object the provision of a simplified construction of such gear, the reduction of the space occupied thereby, improved accessibility to component parts thereof, and such an arrangement of the various elements that the greatest efficiency in operation is obtained.

As is well known by those skilled in the art, coil-springs disposed and acting longitudinally of the gear are employed for receiving impact and affording a cushioning action upon the approach and upon the separation of adjacent vehicles associated with the draft-gear. Hitherto it has been proposed to provide supplemental coil-springs disposed and acting transversely of the draft-gear; but these latter coil-springs have been provided for an auxiliary purpose only and are disposed between the sills, rendering said springs subject to the objection of non-accessibility that is applicable to the longitudinally-disposed springs.

One feature of my invention resides in providing spring mechanism disposed and acting transversely or laterally of the friction-gear, upon which mechanism is imposed the main burden or a very substantial portion of the main burden of affording proper action between the component elements of the gear and resides in providing such spring mechanism in association with friction-blocks that are adapted to move transversely of the gear and other blocks that are adapted to move longitudinally of the gear, which spring mechanism is disposed upon the exterior of the sills in order that it may be accessible and in order that such mechanism may be employed of a proper size to fulfil the functions it is to perform. By disposing this spring mechanism upon the exterior of the sills the space between the sills need not be unduly enlarged, and, moreover, the length of the entire gear may be considerably reduced. By this construction the friction elements are very compactly arranged and the stops against which the longitudinally-acting friction elements are pressed may be very closely approached, so that, together with the close proximity of the sills, an extremely compact structure is secured, lessening the tendency to fracture of any of the elements entering into the gear construction.

Another feature of my invention resides in providing an improved mounting for each longitudinally-acting friction member, whereby the heavy abutments that have hitherto been employed, against which the latter members work, may be dispensed with and whereby special supporting means for the longitudinally-acting friction members may be omitted. To this end I have provided slots in the sills, two in each, the slots in one sill being opposite the slots in the other, a plate in each opposite pair of slots, and a friction member including and carried upon each plate. In other words, each longitudinally-acting friction member is provided with a sliding connection with the sills, preferably accomplished by means of the plates that I have just specified, for convenience of construction—that is, I have mounted these friction members directly upon the sills to have sliding connection therewith, said plates practically forming parts of said members, I do not wish to be limited to a construction in which these plates are separably made. It being desirable for purposes of construction to form the end friction members and the portions thereof that have the sliding connection with the sills in distinct pieces, the pieces that have this direct sliding engagement are preferably made of wrought-iron, so as readily to stand shearing and compression strains. In order that the longitudinally-acting friction members may also have proper engagement with the coupler-yoke and at the same time have proper engagement with the plates that carry them, the friction members are provided each with a plurality of ribs. The plates upon which the friction members are mounted pass through slots in the sills or are otherwise permitted to have longitudinal movement with respect to the sills, so that the yoke may effect the relative approach of the longitudinally-acting friction members and the spring mechanism may effect a separation thereof.

There are other features of my invention that will be explained hereinafter.

I will explain my invention more fully by reference to the accompanying drawings, illustrating the preferred embodiment of the invention, in which—

Figure 1 is a plan view, partially in section, of the draft-gear. Fig. 2 is a sectional view on line 2 2 of Fig. 1. Fig. 3 is a perspective view of the rearward pocketed follower-plate. Fig. 4 is a perspective view of the forward pocketed follower-plate. Fig. 5 is a general perspective view, parts being shown in section.

Like parts are indicated by similar characters of reference throughout the different figures.

The sills $a$ $a$ may be of any well-known or suitable construction and united by any suitable means, there being one strut $b$ indicated as effecting a part of this union between the same. Two slots $c$ and $d$ are provided in each of these sills, the plate $e$ being passed through the forward slots $c$, while the plate $f$ is passed through the rear slots $d$. The front friction member $g$ is mounted upon the forward plate $e$ and the rear friction member $h$ is mounted upon the rear plate $f$. The forward friction member $g$ is provided with two ribs $i$ above the plate $e$ and a corresponding pair of ribs below the said plate, between which sets of ribs the plate $e$ is disposed for the purpose of affording a mounting for the said member and for the further purpose of properly receiving the thrust of the yoke $n$. The longitudinal or side margins of the friction member $g$ are continued to form guiding-surfaces $k$, that serve to keep the member $g$ in a substantially uniform straight line of travel, as the clearance between the said guiding projections $k$ and the sills is slight. The rear friction member $h$ has a plurality of ribs $l$ above the plate $f$ and corresponding ribs $l'$ below the plate, said ribs being preferably curved at their ends to engage the curved end of the yoke. The yoke $n$ is attached to the shank $o$ of the coupler-bar and is of such a length as to encompass both plates $e$ and $f$ when the said plates are spread farthest apart. The friction members $g$ and $h$ carry elements that are preferably provided with friction-surfaces that incline toward the center of the structure and which coöperate with correspondingly-inclined surfaces provided upon the friction-blocks $q$ $q$, that are designed to travel transversely of the sills. The portions of the members $g$ and $h$ upon which the friction-surfaces that engage with the blocks $q$ $q$ are provided are preferably in the form of triangular blocks $g'$ $h'$, that are loose with respect to the balance of the members $g$ and $h$ and with respect to each other. These triangular blocks being loose, the particular elements of the members $g$ and $h$, that carry the same, are desirably provided with pockets $g^2$ $h^2$, into which the said triangular blocks are received. There are preferably two triangular blocks for each element, as indicated, in which case I desirably employ a supplemental friction block or member $q'$, which is provided with inclined friction-surfaces that engage the adjacent friction-surfaces upon each set of triangular friction-blocks. By this arrangement of the central or auxiliary friction elements $q'$ the coil-springs are compressed to a greater extent upon a given longitudinal movement of the coupler than if the members $g$ and $h$ had each only a single friction-block. The pocketed portions $g^2$ $h^2$ are those portions of the members $g$ and $h$ that preferably carry the ribs $l$ $l'$ $i$, that engage the yoke. The friction blocks or members $q$ $q$ are provided with apertures extending transversely of the sills through the blocks, through which apertures the bolt $r$ is passed, which bolt is surrounded with coil-springs $s$ $s$, that engage at their inner ends castings $t$ $t$, that are desirably separately formed with respect to the blocks $q$ $q$ for utility and convenience in assemblage and construction, the castings $t$ $t$ or block mechanism passing through holes in the sills into engagement with the blocks. The outer ends of the bolt $r$ are provided with caps $u$ $u$, that are preferably adjustable, whereby the tension of the springs $s$ between said caps and the castings $t$ may be regulated. The springs $s$ $s$, acting through the castings $t$ upon the blocks $q$, normally bring the said blocks in proximity and effect separation of the members $g$ and $h$ until the plates $e$ and $f$ occupy their normal positions in engagement with the front margins of the slots $c$ and the rear margins of the slots $d$. When the member $h$ is moved forward upon a sufficient pull upon the shank of the coupler and when the member $g$ is moved rearwardly upon a sufficient push upon the shank of the coupler, the blocks $q$ are moved apart against the force of the springs $s$ $s$, which are proportioned to offer the proper resistance to the relative motion between the members $g$ and $h$ for the purpose of the gearing, the springs $s$ effecting the restoration of the parts to their normal positions when normal strain upon the shank of the coupler has been restored. The opening through the friction element or block $q'$ preferably approximates the size of the bolt $r$ very closely. The openings through the blocks $q$, however, preferably increase slightly in size toward the center, so that the blocks $q$ $q$ will not bind upon the rod or bolt $r$. The plates $e$ and $f$ are provided with keys or cotter-pins $e'$ and $f''$ to prevent the said plates from being withdrawn from the sills. As indicated, the sills are provided with oblong recesses $y$, midway between the ends of which the bolt or rod $r$ is normally disposed, the said rod being pushed or pulled toward one end or the other of said slots, according to the direction of movement of the coupler-yoke, the rate of travel of the rod in the construction shown being approximately one-half the rate of movement of the coupler-yoke.

The advantages in the construction of my invention will be readily understood by those skilled in the art. It will be seen that I have provided an improved spring connection between the spring mechanism of a draft-gear and the coupler-shank, which improved connection includes a sliding plate or sliding plates passing through the slots in the sills of the gear. This construction I consider to be new with me irrespective of the disposition of the friction elements of the gear. It will also be seen that the provision of slots in the sills and plates $e$ and $f$ in said slots afford a very convenient means of effecting connection between the coupler and the spring mechanism. It will be particularly apparent that the sills may be completely installed in position without interfering with the assemblage of the friction-gear before the elements of the friction-gear are assembled, which elements may thereafter readily be assembled by means of my improved construction. I do not wish to be limited in all embodiments of my invention to the disposition of the spring mechanism transversely of the sills, as it is obvious that features of the invention may be practiced irrespective of the precise location and direction of operation of said mechanism. It will be seen that the spring mechanism including the rod is bodily movable longitudinally of the sills.

The elements $e$ and $f$ may be said to constitute keys. Each of these elements, with its associate pocketed follower-plate and the triangular friction-blocks carried by the follower-plate, constitute a longitudinally-movable friction member, and while this form of friction member is preferred I do not wish to be limited thereto. While the friction-blocks $g'$ $h'$ in the embodiment of the invention shown are movable sidewise as they move longitudinally, nevertheless it is apparent that said blocks $g'$ $h'$ are longitudinally-movable elements. Inasmuch as the pocketed follower-plates and the keys are essential in the embodiment of the invention shown to enable the friction-blocks $g'$ $h'$ to perform their function, it is proper to speak of the longitudinally-movable friction members as comprising each a pocketed follower-plate, a key, and the friction-blocks.

While I have shown two adjustable caps $u$ for the rod $r$, it is obvious that in the construction shown but one cap need be adjusted to take up the set in the springs, which adjustability of the mechanism is a very important feature of my present invention.

So far as I am aware there is no friction draft-gear patented or used or known wherein the adjustment is provided for taking up the set in the springs or the wear in the friction-blocks. The springs invariably become set in service, so that in a short time there is considerable lost motion in each draft-gear after it has been used a short while, due to the shortening of the springs and the wear of the blocks. I believe I am the first to provide mechanism whereby this lost motion may be remedied.

It will be seen that the triangular friction-blocks in the pocketed follower-plates move transversely and apart upon the operation of the spring mechanism by the coupler.

I have used the expression "sills" herein in the broadest sense. By the term "adjustable" or "adjustment" or equivalent expression used in the claims and specification I mean to imply a mechanism whereby the lost motion due to the wear on the frictional parts or the set of the springs may be compensated for or removed and whereby this result may be accomplished without change of springs.

While by means of my invention I am enabled to use the center sills of the car-bodies as draft-sills, in certain constructions it may be found desirable to add special draft sills or guides, and such construction is contemplated herein.

It is obvious that changes may be made in the construction herein shown without departing from the spirit of my invention, and I do not, therefore, wish to be limited to the precise construction specifically shown; but, Having thus set forth my invention, I claim as new and desire to secure by Letters Patent—

1. In a friction draft-gear, the combination with longitudinally-acting friction members, of transversely-acting friction members, the sills between which said friction members are disposed, and spring mechanism acting upon said members and bodily movable longitudinally of the sills, the spring portion of which is upon the exterior of said sills and there accessible.

2. In a friction draft-gear, the combination with the friction members thereof, the sills between which said members are disposed, a bolt $r$ passing through a sill and a transversely-acting friction member, and a spring element $s$ upon the exterior of the sills and coöperating with the friction members and bodily movable longitudinally of the sills.

3. In a friction draft-gear, the combination with longitudinally-acting friction members, of transversely-acting friction members, the sills between which said friction members are disposed, the transversely-movable friction members being apertured transversely of the sills, a bolt $r$ passing through said latter members and the sills, and springs $s$ upon the exterior of the sills acting in opposition to the transversely-movable members.

4. In a friction draft-gear, the combination with longitudinally-acting friction members, of transversely-acting friction members, the sills between which said friction members are disposed, the transversely-movable friction members being apertured transversely of the sills, a bolt $r$ passing through said latter members and the sills, springs $s$ upon the exterior of the sills acting in opposition to the transversely-movable members, and castings or elements $t$ separately formed from the transversely-acting members passing through the sills into engagement with said members and effecting engagement with said springs.

5. In a friction draft-gear, the combination with longitudinally-acting friction members, of transversely-acting friction members, the sills between which said friction members are disposed, the transversely-movable friction members being apertured transversely of the sills, a bolt $r$ passing through said latter members and the sills, springs $s$ upon the exterior of the sills acting in opposition to the transversely-movable members, castings or elements $t$ separately formed from the transversely-acting members passing through the sills into engagement with said members and effecting engagement with said springs, and adjustable caps upon the ends of the bolt engaging said springs.

6. In a friction draft-gear, the combination with longitudinally-acting friction members, of transversely-acting friction members, the sills between which said friction members are disposed, a casting or element $t$ separately formed with respect to a friction member and passing through a sill, and a spring $s$ upon the exterior of the sills operating upon the said element $t$ and thereby upon the friction members.

7. A friction draft-gear including sills, a longitudinally-movable friction member having sliding mounting in slots provided in the said sills, and spring mechanism having spring adjustment.

8. A friction draft-gear including the sills thereof, longitudinally-movable friction members having sliding mounting upon the sills, transversely-movable friction members, spring mechanism against the force of which said friction members are moved, a yoke, and a coupler with which the said yoke is connected, the said yoke acting upon the friction members, the said sills being slotted to receive portions of the longitudinally-movable friction members, the portions of the said members engaging the said slots being in the form of plates separately formed from the balance of said members.

9. A friction draft-gear including the sills thereof, longitudinally-movable friction members having sliding mounting upon the sills, transversely-movable friction members, spring mechanism against the force of which said friction members are moved, a yoke, and a coupler with which the said yoke is connected, the said yoke acting upon the friction members, the said sills being slotted to receive portions of the longitudinally-movable friction members, the portions of the said members engaging the said slots being in the form of plates separately formed from the balance of said members, said spring mechanism acting transversely of the sills upon the friction members.

10. A friction draft-gear including the sills thereof, longitudinally-movable friction members having sliding mounting upon the sills, transversely-movable friction members, spring mechanism having spring adjustment and against the force of which said friction members are moved, and a coupler, the said sills being slotted to receive portions of the longitudinally-movable friction members, said spring mechanism being upon the exterior of the sills and coöperating with the friction members.

11. A friction draft-gear including the sills thereof, longitudinally-movable friction members having sliding mounting upon the sills, transversely-movable friction members, spring mechanism against the force of which said friction members are moved, a yoke, and a coupler with which the said yoke is connected, the said yoke acting upon the friction members, the said sills being slotted to receive portions of the longitudinally-movable friction members, the portions of the said members engaging the said slots being in the form of plates separately formed from the balance of said members, said spring mechanism being upon the exterior of the sills acting upon said friction members.

12. A friction draft-gear including the slotted sills thereof, the spring mechanism therefor having spring adjustment, plates working in the slots and in operative connection with the spring mechanism, and a coupler in engagement with the plates, one plate receiving the thrust of the coupler and the other plate receiving the pull of the coupler.

13. A friction draft-gear including relatively movable triangular friction-blocks, a central longitudinally-disposed friction element $q'$ interposed between and frictionally engaging the same, and transversely-movable friction-blocks $q$ between which the said friction element $q'$ is disposed, which blocks $q$ also have frictional engagement with the triangular blocks.

14. A friction draft-gear including relatively movable triangular blocks $g'$, relatively movable triangular blocks $h'$, a coupler in pushing relation with the first triangular blocks and in pulling relation with the second triangular blocks, transversely-movable friction-blocks $q$ $q$, a friction element $q'$ interposed between the blocks $q$ $q$ and frictionally engaging at one end the blocks $g'$ and frictionally engaging at the other end the blocks $h'$, and spring mechanism to effect the frictional engagement that is to be maintained between the friction blocks or elements.

15. A friction draft-gear including relatively movable triangular blocks $g'$, relatively movable triangular blocks $h'$, a coupler in pushing relation with the first triangular blocks and in pulling relation with the second triangular blocks, transversely-movable friction-blocks $q\ q$, a friction element $q'$ interposed between the blocks $q\ q$ and frictionally engaging at one end the block $g'$ and frictionally engaging at the other end the block $h'$, sills between which the said friction-blocks and elements are disposed, and spring mechanism acting transversely of the sills to effect the desired frictional engagement between the said friction blocks and elements.

16. In a friction draft-gear, the combination with friction members, of the sills between which said friction members are disposed, and spring mechanism upon the exterior of said sills acting upon said members and having spring adjustment, said spring mechanism being bodily movable longitudinally of the sills.

17. A friction draft-gear including friction members, the sills between which said friction members are disposed, spring mechanism upon the exterior of the sills and acting transversely thereof, and block mechanism $t$ extending from between the sills to the exterior thereof and receiving spring-pressure from the spring mechanism and transferring the spring-pressure to the friction portion of the gear.

18. A friction draft-gear including friction members, the sills between which said friction members are disposed, spring mechanism upon the exterior of the sills and acting transversely thereof, a rod extending transversely of the sills and provided with an adjustable cap for effecting adjustment of the spring mechanism, and block mechanism $t$ extending from between the sills to the exterior thereof and receiving spring-pressure from the spring mechanism and transferring the spring-pressure to the friction portion of the gear.

19. A friction draft-gear including friction members, the sills between which said friction members are disposed, spring mechanism upon the exterior of the sills and acting transversely thereof, a rod extending transversely of the sills and through the spring mechanism and provided with an adjustable cap for effecting adjustment of the spring mechanism, and block mechanism $t$ extending from between the sills to the exterior thereof and receiving spring-pressure from the spring mechanism and transferring the spring-pressure to the friction portion of the gear.

20. A friction draft-gear including friction members, the sills between which said friction members are disposed, spring mechanism upon the exterior of the sills and acting transversely thereof, a rod extending transversely of the sills and through the same and the spring mechanism and provided with an adjustable cap for effecting adjustment of the spring mechanism, and block mechanism $t$ extending from between the sills to the exterior thereof and receiving spring-pressure from the spring mechanism and transferring the spring-pressure to the friction portion of the gear.

21. A friction draft-gear including friction members, the sills between which said friction members are disposed, spring mechanism upon the exterior of the sills and acting transversely thereof, a rod extending transversely of the sills and through the same and provided with an adjustable cap for effecting adjustment of the spring mechanism, and block mechanism $t$ extending from between the sills to the exterior thereof and receiving spring-pressure from the spring mechanism and transferring the spring-pressure to the friction portion of the gear.

22. A friction draft-gear including friction members, the sills between which said friction members are disposed, spring mechanism upon the exterior of the sills, and block mechanism $t$ extending from between the sills to the exterior thereof and receiving spring-pressure from the spring mechanism and transferring the spring-pressure to the friction portion of the gear.

23. A friction draft-gear including transversely-acting friction members, the sills between which the same are disposed, spring mechanism upon the exterior of the sills, and a rod $r$ extending transversely of the sills through the spring mechanism into the space between the sills, the sill or sills through which the rod passes being longitudinally slotted to permit of the movement of the rod and the spring mechanism longitudinally of the sills, said rod also passing through that transversely-acting friction member upon which the spring mechanism directly acts.

24. A friction draft-gear including transversely-acting friction members, the sills between which the same are disposed, spring mechanism upon the exterior of the sills, and a rod $r$ extending transversely of the sills through the spring mechanism into the space between the sills, the sill or sills through which the rod passes being longitudinally slotted to permit of the movement of the rod and the spring mechanism longitudinally of the sills.

25. A friction draft-gear including relatively movable triangular friction-blocks, a longitudinally-disposed friction element $q'$ interposed between and frictionally engaging the same, and transversely-movable friction-blocks $q$ between which the said friction element $q'$ is disposed, which blocks $q$ also have frictional engagement with the triangular blocks.

26. In a friction draft-gear, the combination with friction members, of the sills between which said friction members are disposed, and transversely-acting spring mechanism upon the exterior of said sills acting upon said members bodily movable longitudinally of the sills and having spring adjustment.

27. In a friction draft-gear, the combination with friction members, of the sills between which said friction members are disposed, and spring mechanism upon the exterior of the sills acting upon said members, said spring mechanism including a rod $r$ extending transversely of the sills through the same and provided with an adjusting-cap for effecting adjustment of the spring mechanism.

28. In a friction draft-gear, the combination with friction members, of the sills between which said friction members are disposed, and spring mechanism upon the exterior of the sills acting upon said members, said spring mechanism including a rod $r$ extending transversely of the sills and provided with an adjusting-cap for effecting adjustment of the spring mechanism, said rod passing through the spring of the spring mechanism into the space between the sills.

29. In a friction draft-gear, the combination with friction members, of the sills between which said friction members are disposed, and spring mechanism upon the exterior of the sills and including a rod passing into the space between the sills and bodily movable longitudinally of the sills.

30. In a friction draft-gear, the combination with friction members, of the sills between which said friction members are disposed, and spring mechanism upon the exterior of the sills bodily movable longitudinally of the sills and including a rod passing into the space between the sills and through the spring portion of the spring mechanism and the friction member or members immediately associated with said spring portion.

31. In a friction draft-gear, the combination with friction members, of the sills between which said friction members are disposed, and spring mechanism upon the exterior of the sills bodily movable longitudinally of the sills and including a rod passing into the space between the sills and through the friction member or members immediately associated with said spring portion.

32. A friction draft-gear including friction members, the sills between which the same are disposed and spring mechanism upon the exterior of the sills, and movable bodily longitudinally of the sills and having spring adjustment.

33. A friction draft-gear including friction members, sills between which the same are disposed, spring mechanism upon the exterior of the sills, and a rod passing through the spring mechanism and the sills, the said spring mechanism and the rod being movable bodily longitudinally of the sills.

34. In a friction draft-gear, the combination with friction members, of the sills between which the said friction members are disposed and spring mechanism upon the exterior of the sills including a rod passing through the sills and bodily movable longitudinally of the sills.

35. A friction draft-gear including friction members, sills between which the same are disposed, spring mechanism upon the exterior of the sills, a rod passing through the spring mechanism and the sills, and means for effecting spring adjustment.

36. A friction draft-gear including friction members, sills between which the same are disposed, spring mechanism upon the exterior of the sills, a rod passing through the spring mechanism and the sills, the said spring mechanism and the rod being movable bodily longitudinally of the sills, and means for effecting spring adjustment.

37. In a friction draft-gear, the combination with friction members, of the sills between which the said friction members are disposed, spring mechanism upon the exterior of the sills including a rod passing through the sills and bodily movable longitudinally of the sills, and means for effecting spring adjustment.

38. The combination with a draft and buffing gear, provided with slotted supports and constructed substantially as described, of a front follower with a passage therethrough, a rear follower with a passage, keys within the passages of the followers and slots of the supports, and a friction device between the followers.

39. The combination with a draft and buffing gear, provided with slotted supports, of a front follower with a passage therethrough, a rear follower with a passage, keys within the passages of the followers and slots of the supports, a friction device, and a spring.

In witness whereof I hereunto subscribe my name this 15th day of May, A. D. 1905.

JAMES R. CARDWELL.

Witnesses:
GEORGE L. CRAGG,
LEON STROH.